United States Patent [19]

Shatavsky

[11] 4,123,789
[45] Oct. 31, 1978

[54] MAGNETIC TAPE STORAGE AND TRANSPORT CARTRIDGE AND MECHANISMS THEREFOR

[76] Inventor: Rubin Shatavsky, 14343 Addison St., #208, Sherman Oaks, Calif. 91423

[21] Appl. No.: 848,448

[22] Filed: Nov. 4, 1977

[51] Int. Cl.² .................... G11B 15/29; G11B 23/08
[52] U.S. Cl. ........................... 360/96; 242/192; 242/199; 242/201; 242/209; 360/122; 360/130; 360/132
[58] Field of Search ............... 242/192, 201, 199, 200, 242/197, 194, 67.5, 210, 54 A, 206, 209; 360/132, 96, 93, 134, 90, 122, 130

[56] References Cited

U.S. PATENT DOCUMENTS

| 3,389,915 | 6/1968 | Owen et al. | 242/201 |
| 4,000,514 | 12/1976 | Fukatsu | 360/96 |
| 4,010,491 | 3/1977 | Gerry | 242/201 |

Primary Examiner—George F. Mautz
Attorney, Agent, or Firm—Allan M. Shapiro

[57] ABSTRACT

Cartridge has a single tape storage chamber in which the ends of a finite length of prestressed magnetizable tape are coiled and stored. The cartridge rotatably carries the resilient tape pressure roll around which the tape extends. The mechanism which utilizes the cartridge has two capstans engaging opposite sides of the pressure roll to rotate the pressure roll and advance the tape.

13 Claims, 4 Drawing Figures

U.S. Patent     Oct. 31, 1978     4,123,789
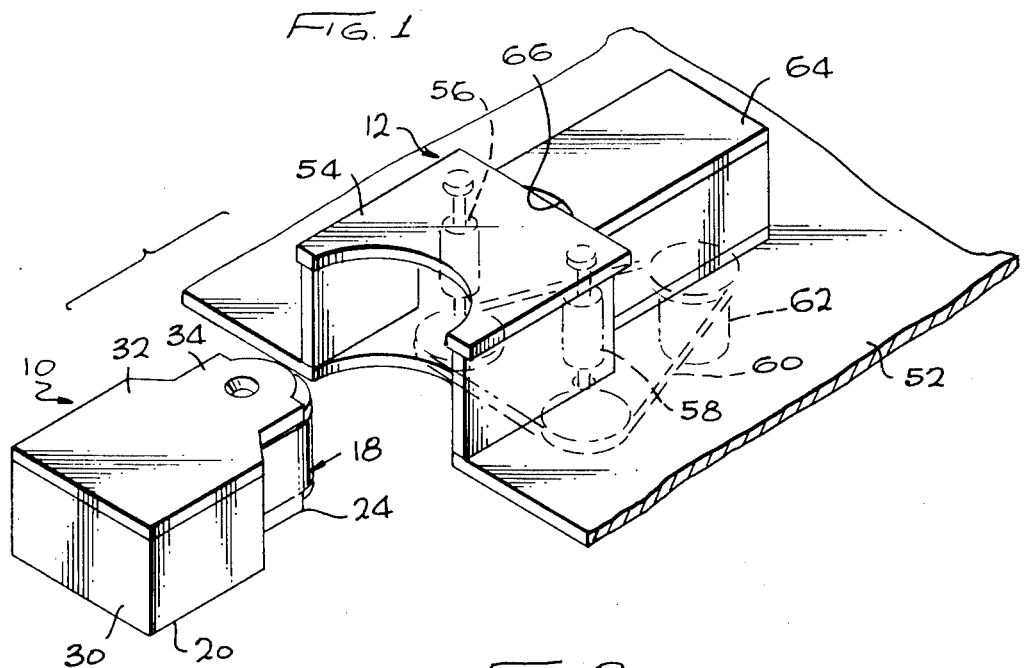
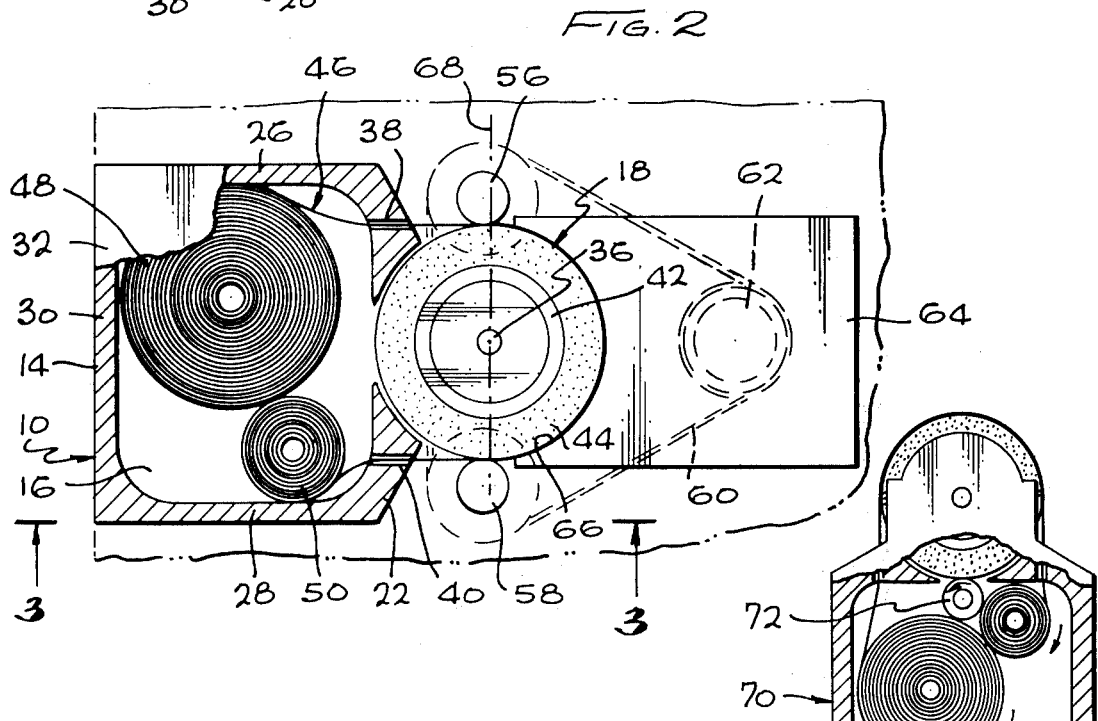
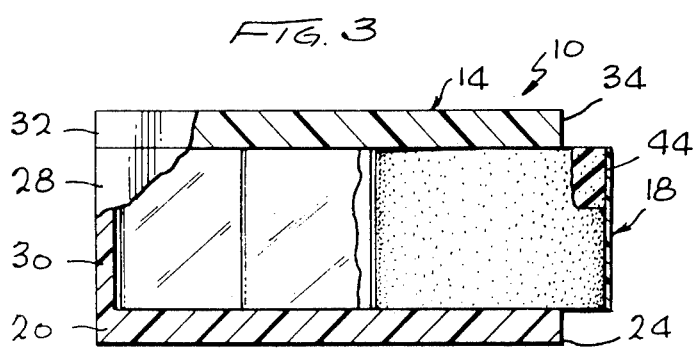

MAGNETIC TAPE STORAGE AND TRANSPORT CARTRIDGE AND MECHANISMS THEREFOR

BACKGROUND OF THE INVENTION

1. Field of the Invention

This invention is directed to a magnetic tape storage and transport cartridge which contains a finite length of prestressed coiled tape and to the mechanism which employs the cartridge to transport, record on, and read the tape.

2. Description of the Prior Art

Magnetic tape has been wound on flanged spools for storage and use. On a tape deck utilizing such flanged spools, the tape is unwound from the first spool, on which it has been stored, and is transported across magnetic recording heads, and then is wound up on a new spool. Such spools can handle a long length of tape, but suffer from the disadvantage that the very length of the tape makes it difficult to randomly access the information on the tape. The mass of the tape and the spool is great so that acceleration must be low to prevent damage to the tape.

With the utilization of a housing, the flanges of the spools can be eliminated, as in the modern-day four-track magnetic cassette. Such cassettes and similar structures utilize the external drive of the hubs on which the tape is wound to traverse the tape and to take it up during transport. Such structures also have comparatively high mass and resultant high inertia due to the hubs and the length of the tape wound thereon. Furthermore, storage density is poor because one of the hubs is empty when the other is full.

Present-day structures which utilize tape also include the endless cartridge which relies on the tape feeding into the housing and sinuously moving through the housing. Such has a poor packing density because of the lack of control of the tape in the housing.

Thus, there is need for a magnetic tape storage and transport cartridge which has low mass and inertia in the moving parts and which utilizes its space to the maximum potential for high information packing density.

SUMMARY OF THE INVENTION

In order to aid in the understanding of this invention, it can be stated in essentially summary form that it is directed to a magnetic tape storage and transport cartridge which has a single tape storage chamber therein and a magnetic tape which is prestressed to coil upon itself and which has both of its ends coiled in the chamber so that the chamber space is shared and utilized to a major extent. The cartridge has a pressure roll rotatable thereon around which the tape extends.

It is thus an object of this invention to provide a magnetic tape storage and utilization cartridge having high density storage and which is particularly useful for recording and playing back information. It is another object to provide such a cartridge which has low mass and low inertia in the moving parts so that high acceleration of the tape can be achieved for rapid access to the information along the tape. It is a further object to provide such cartridge wherein the tape is supported through the reading area to minimize tape distortion to permit higher information packing density per unit length of tape. It is another object to provide a magnetic tape cartridge which is capable of storage of two megabytes (18 megabits) of information per cubic inch. It is another object to provide a mechansim which utilizes such a cartridge. It is a further object to provide a mechansim which can advance the tape and read the tape of such a cartridge as the tape is advanced.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is an isometric view of the magnetic tape storage and transport cartridge of this invention shown adjacent to its associated transport mechanism, with parts broken away and shown in section and with some hidden parts in phantom lines.

FIG. 2 is an enlarged top plan view of the cartridge in its transport mechansim, with parts broken away and parts taken in section.

FIG. 3 is a section taken generally along the line 3—3 of FIG. 2, with parts broken away to show the tape in its storage chamber and extending around its supporting pressure roll.

FIG. 4 is a plan view on reduced scale, with parts broken away and parts taken in section, of a further preferred embodiment of the cartridge of this invention.

DESCRIPTION OF THE PREFERRED EMBODIMENT

FIG. 1 shows the magnetic tape storage and transport cartridge of this invention as generally indicated at 10. Cartridge 10 is associated with head mechanism 12 which is particularly designed to support and retain cartridge 10 and to advance the tape in the cartridge for reading and recording on the magnetic tape.

Particularly in digital computer memories is it necessary to accelerate magnetic tape at high rates to reach the location at which reading or recording is to take place. Low mass of the moving parts means low inertia which permits high accelerations in starting and stopping. In magnetic tape storage for such uses, it is desirable to achieve maximum packing density. The limitations on bits density stems from how close together on the tape data can be stored and recovered in correct order. The limitations come from dynamic skew on the tape which is the non-uniform advance (from edge-to-edge of the tape) which appear as wriggles in movement of the tape. Another limitation is the difference in stress across the width of the tape which causes difference in the elongation. These problems result in the prior art achieving about 3,200 bits to the inch with 9 bits across a half-inch wide tape. It can be seen from the description below of cartridge 10 that the present tape is properly transported and supported so that those problems are overcome.

Cartridge 10 is formed of body 14 which defines tape storage chamber 16 and supports pressure roll 18. Body 14 has bottom 20 which extends forward past front wall 22 to form tongue 24. Tape storage chamber 16 is further defined by sidewalls 26 and 28 and back wall 30. Body 14 can be of unitary construction, as shown, preferably injection-molded for economic manufacture. Cover 32 is secured to the top of body 14 to enclose tape storage chamber 16. Cover 32 has tongue 34 which reaches forward to face tongue 24. Tape slots 38 and 40 extend through front wall 22 adjacent pressure roll 18.

Pressure roll 18 is positioned between tongues 24 and 34. Pivot pin 36 rotatably supports pressure roll 18, and the pivot pin is mounted in the tongues. Pressure roll 18 comprises hub 42 which is of low mass and low inertia construction, and the hub is covered by a resilient cylindrical tire 44.

Tape 46 is magnetic recording tape. Tape 46 is prestressed so that it tends to wind on itself and make a self-winding tape. The prestress may be accomplished in the tape by winding the conventional mylar tape on a spindle and then subjecting the wound tape to a sufficiently high temperature, for example, above 200 degrees F., for relieving the stresses in the tape while the tape is in the wound condition. By such stress-relieving and then cooling in the wound condition, the tape thus is prestressed so that it will have an inherent curl so that the tape tends to return to its curled or wound configuration. Tape 46 has storage coils 48 and 50 and, between the storage coils, the tape passes out through tape slot 38 around the front of pressure roll 18 and back in tape slot 40 to the other storage coil. Both of the storage coils lie in the same tape storage chamber 16 so as to share the chamber. As the tape is advanced by rotation of pressure roll 18, one of the storage coils increases in size and the other decreases so that a great packing density can be achieved in the shared chamber space.

Heat mechansim 12, see FIGS. 1 and 2, is particularly arranged to support and utilize cartridge 10. Head mechanism 12 has baseplate 52 on which is mounted top plate 54. The plates are spaced so that cartridge 10 can enter therebetween. First and second capstans 56 and 58 are rotatably mounted on the plates and are positioned between the plates. Capstans 56 and 58 are driven together by drive belt 60 which engages around pulleys on the bottom of both capstan shafts below base plate 52. Drive belt 60 is driven by capstan motor 62.

Magnetic head 64 has surface 66 which is cylindrical in configuration and has the same radius as pressure roll 18. Surface 66 has the magnetic gaps therein for reading and writing on the magnetic tape. Surface 66 acts as a stop for cartridge 10 as the cartridge is inserted from the left-to-right direction (as seen in FIGS. 1 and 2) into its drive and reading mechansim 12. Thus, the tape is against surface 66 when the cartridge is fully inserted. The dimension between the drive surfaces of capstans 56 and 58 is slightly less than the diameter of drive roller 18. Furthermore, the centers of the capstans are slightly behind the center of pressure roller 18 when the cartridge is fully inserted, as shown in FIG. 2. Line 68 is an illustrative imaginary line through pivot center 36 of pressure roll 18, and that line is slightly in front of the centers of rotation and the center axes of the cylindrical surfaces of capstans 56 and 58, when the cartridge is fully inserted with its tape 46 around the front of pressure roll 18 in direct and firm engagement with surface 66 of magnetic head 64.

Thus, insertion of the cartridge into head mechansim 12 comprises resiliently compressing the resilient tire 44 as the largest diameter of the tire on pressure roll 18 goes between the capstans so that the cartridge goes in between the capstans in a snap-in, over-center retention of the pressure roll between the capstans. In the over-center position, the diameter of the pressure roll is such that pressure is maintained on both of the capstans by resilient deflection of the tire. Tape 46 is supported around the pressure roll from the first capstan to the second capstan. The coefficient of friction of the tape on the pressure roll is greater than the coefficient of friction of the tape with respect to surface 66 of head 64. Therefore, the tape moves with respect to the head.

However, there is no distortion of the tape with respect to the head because the tape is supported by the pressure roll throughout the head area. In this way, distortion is minimized thereby reducing both dynamic and static skew. With this minimized static and dynamic skew, the linear packing density on the tape is very much increased. With the considerable reduction in dynamic and static skew and with the shared storage of storage coils 48 and 50 in the same tape storage chamber 16, packing density can go as high as 18 megabits per cubic inch. Additionally, this configuration permits the plug-in arrangement of the cartridge and permits the use of a small head mechanism 12 so that such mechanisms can be closely spaced for minimum machine space per tape head.

FIG. 4 illustrates cartridge 70 which is identical to cartridge 10 except for the presence of idler roller 72. Idler roller 72 is pivotally mounted between the body and cover of the cartridge. It is positioned so that it is in frictional drive contact with the back of the pressure roll so that it rotates within the storage chamber. This direction of rotation of idler roller 72 is compatible with the direction of motion of both of the storage coils in the storage chamber. Thus, idler roller 72 helps to wind up the storage coil that is winding and maintains separation between the two storage coils. In cartridge 70, as in cartridge 10, the space in the tape storage chamber is shared by the two storage coils. Both of the coils have the freedom to float so that the larger coil can occupy more than half the space in the chamber so as to maximize space usage.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A magnetic tape cartridge comprising:
   a body, a tape storage chamber in said body;
   a pressure roll rotatably mounted on said body; and
   a flexible magnetic tape, said tape having first and second ends, said tape being prestressed so that said ends wind themselves into first and second storage coils, said tape being positioned so that both of said first and second storage coils are positioned within said tape storage chamber to share the space within said chamber and, intermediate said ends, said tape passes around said pressure roll.

2. The cartridge of claim 1 wherein:
   said pressure roll is cylindrical, said pressure roll has more than half of its circumference exposed externally of said cartridge, and said tape engages around more than half of the circumference of said pressure roll.

3. The cartridge of claim 2 wherein:
   there are a pair of openings in said body, said openings being between said pressure roll and said tape storage chamber, and said tape passes through said openings.

4. The cartridge of claim 3 wherein said openings are slots.

5. The cartridge of claim 3 wherein said pressure roll has a resilient surface.

6. The tape cartridge of claim 5 wherein:

said body has walls including a front wall to define said chamber and has a tongue extending past said front wall, and said body has a cover thereon to enclose said chamber and said cover has a tongue thereon facing said tongue on said body, said pressure roll being rotatably supported between said tongues, said pressure roll being exposed more than half of its circumference beyond said tongues.

7. The cartridge of claim 6 further including:
an idler roll rotatably positioned within said tape storage chamber and in engagement with said pressure roll so that said idler roll rotates with said pressure roll, said idler roll engaging both of said storage coils to aid in the winding of said storage coils.

8. The cartridge of claim 5 further including, in combination:
a tape head mechanism for use in association therewith, said tape head mechanism including a tape head having a partially cylindrical surface, said partially cylindrical surface being positioned for direct engagement by tape on the exposed portion of said pressure roll.

9. The combination of claim 8 wherein said mechanism includes:
at least one capstan, said capstan being positioned for engagement on said tape where it is wrapped on said pressure roll so as to advance said tape and rotate said pressure roll when said capstan rotates.

10. The combination of claim 9 wherein:
there are two said capstans, said capstans having substantially cylindrical drive surfaces and having their drive surfaces spaced closer together than the diameter of said pressure roll, said capstans being positioned so that, when said tape on said pressure roll is in engagement with said head, both of said capstans resiliently engage said tape on said pressure roll.

11. The combination of claim 10 wherein:
said capstans are positioned so that, when the tape on the exposed portion of said pressure roll is against said tape head, there is more than one-half turn of tape on the exposed side of said pressure roll between said capstans.

12. A tape head mechanism including, in combination:
a magnetic tape head, said tape head having a partially cylindrical concave surface, said surface having a cylindrical axis;
first and second capstans, said first and second capstans being rotatably mounted with respect to said tape head on rotation axes which are substantially parallel to said axis of said tape head surface, said axes of said capstans being beyond a plane through said axis of said cylindrical tape head surface from said tape head surface;
a tape cartridge, said cartridge having a body and a tape storage chamber in said body, said cartridge having a resilient pressure roll rotatably mounted on said body; and
a magnetic tape having first and second ends, said magnetic tape extending around said pressure roll intermediate said ends, said magnetic tape being prestressed so that said ends of said tape coil individually upon themselves to form first and second storage coils, both said first and second storage coils being positioned within said tape storage chamber to share said tape storage chamber, said capstans engaging said tape where it extends around said pressure roll to move said tape in and out of said storage chamber and past said magnetic head.

13. The combination of claim 12 wherein:
said pressure roll rotates substantially on said cylindrical axis of said magnetic tape head so that said capstans resiliently engage said pressure roll by resilient deflection of said resilient pressure roll and engage said pressure roll so that more than half the circumference of said pressure roll has tape wrapped thereon and exposed thereon and so that said capstans and said pressure roll resiliently retain said cartridge in said mechanism.

* * * * *